United States Patent [19]
Smith

[11] Patent Number: 5,669,693
[45] Date of Patent: Sep. 23, 1997

[54] HOLOGRAPHIC THIN TAILLAMP

[75] Inventor: Ronald T. Smith, Torrance, Calif.

[73] Assignee: Hughes Electronics, Los Angeles, Calif.

[21] Appl. No.: 633,612

[22] Filed: Apr. 17, 1996

[51] Int. Cl.⁶ ..................................... F21V 7/04
[52] U.S. Cl. .................. 362/31; 362/26; 362/27
[58] Field of Search .................. 362/31, 26, 27

[56] References Cited

U.S. PATENT DOCUMENTS

| | | | |
|---|---|---|---|
| 4,794,492 | 12/1988 | Vinther | 362/31 |
| 4,806,903 | 2/1989 | Rust | 362/31 |
| 4,918,578 | 4/1990 | Thompson | 362/31 |
| 5,146,354 | 9/1992 | Plesinger | 362/31 |
| 5,150,960 | 9/1992 | Redick | 362/31 |
| 5,375,043 | 12/1994 | Tokunaga | 362/31 |
| 5,433,024 | 7/1995 | Lerner | 362/31 |
| 5,438,453 | 8/1995 | Kuga | 362/31 |
| 5,499,165 | 3/1996 | Holmes | 362/31 |

*Primary Examiner*—Carroll B. Dority
*Attorney, Agent, or Firm*—Leonard A. Alkov; Wanda K. Denson-Low

[57] ABSTRACT

A holographic rear exterior lamp for a vehicle including a light pipe (11, 51) having a first planar surface (11a, 51a) and a second planar surface (11b, 51b) that are opposite each other, and a planar entrance surface (11c, 51c) located between adjacent edges of the first planar surface and the second planar surface; a rear exterior lamp hologram (21) attached to the first planar surface of the light pipe; and a light source (20, 21) for illuminating the entrance surface such that the rear exterior lamp hologram diffracts a portion of the light that is transmitted by the entrance surface to provide rear exterior lamp illumination.

9 Claims, 3 Drawing Sheets

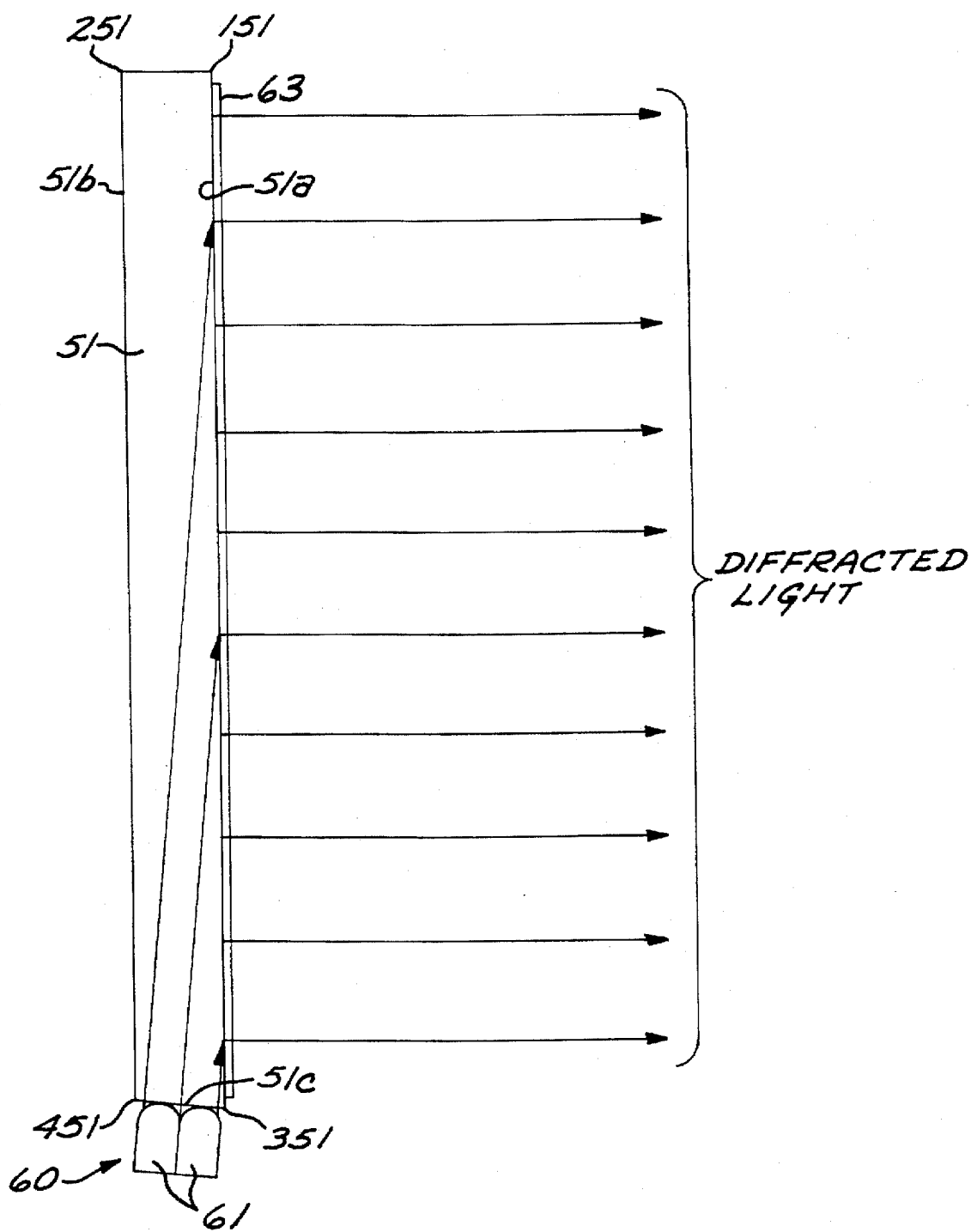

HOLOGRAPHIC THIN TAILLAMP

BACKGROUND OF THE INVENTION

The disclosed invention is directed generally to holographic rear exterior lamps for vehicles, and more particularly to a holographic thin rear exterior lamp for vehicles.

Vehicles such as automobiles are required to have rear exterior lamps which function as tail lamps, stop lamps and turn signal lamps. Rear exterior lamps for vehicles are conventionally comprised of an incandescent bulb, a reflector, a suitably colored lens, and a housing.

Considerations with conventional rear exterior lamps include large size, heavy weight, complexity, and the need to configure the rear structure of a vehicle to accommodate the thickness of the rear exterior lamp.

SUMMARY OF THE INVENTION

It would therefore be an advantage to provide a rear exterior lamp for a vehicle that is thin, compact, and of light weight.

The foregoing and other advantages are provided by the invention in a holographic rear exterior lamp assembly that includes a light pipe having a first planar surface, a second planar surface, and a planar entrance surface between adjacent edges of the first planar surface and the second planar surface; a rear exterior lamp hologram attached to the first planar surface of the light pipe; and a light source for illuminating the entrance surface such that the rear exterior lamp hologram diffracts a portion of the light that is transmitted by the entrance surface to provide rear exterior lamp illumination.

BRIEF DESCRIPTION OF THE DRAWINGS

The advantages and features of the disclosed invention will readily be appreciated by persons skilled in the art from the following detailed description when read in conjunction with the drawing wherein:

FIG. 3 is a schematic side elevational view of a further holographic rear exterior vehicle lamp in accordance with the invention.

DETAILED DESCRIPTION OF THE DISCLOSURE

Figure 1:
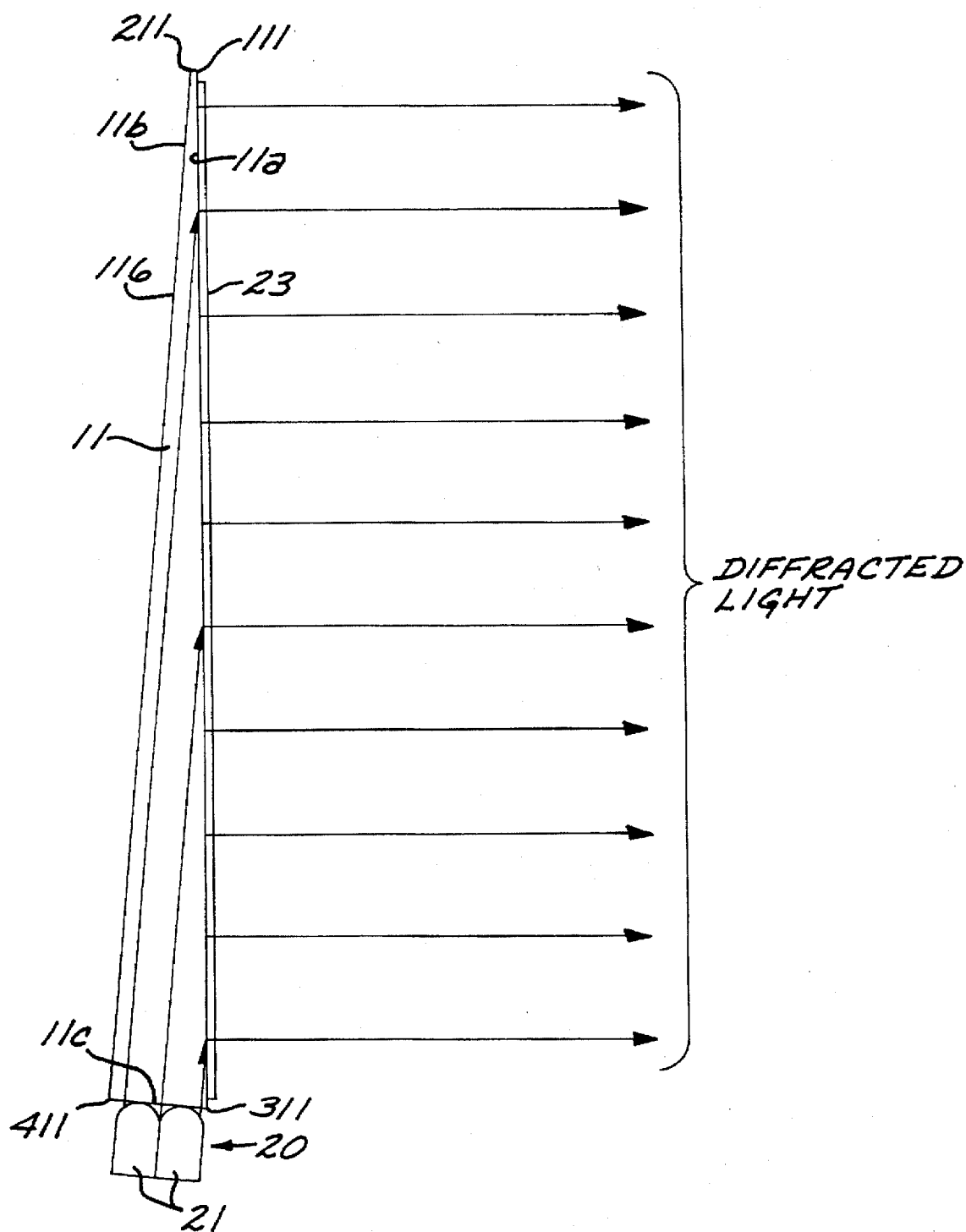
FIG. 1 is a schematic side elevational view of a holographic rear exterior vehicle lamp in accordance with the invention.

In the following detailed description and in the several figures of the drawing, like elements are identified with like reference numerals.

Figure 2:
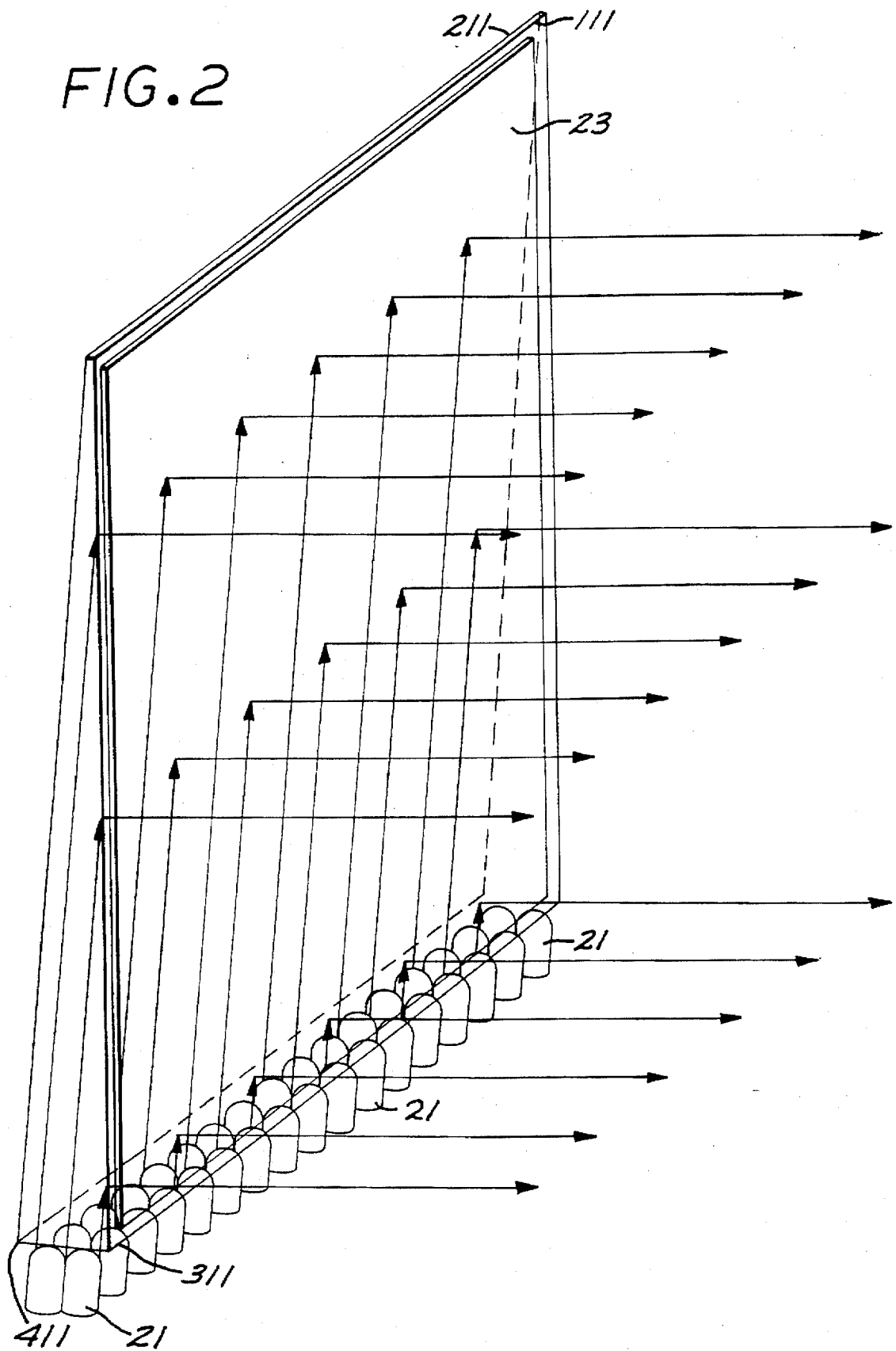
FIG. 2 is a schematic perspective view of the holographic rear exterior vehicle lamp of FIG. 1.

Referring now to FIGS. 1 and 2, set forth therein are a schematic side elevational view and a schematic perspective view of a holographic rear exterior vehicle lamp in accordance with the invention. The holographic rear exterior lamp includes a thin wedge shaped transparent light pipe 11 having a first planar surface 11a and a second planar surface 11b that are opposite each other. The first planar surface 11a and the second planar surface 11b include adjacent top edges 111, 211 and adjacent bottom edges 311, 411, all of which can be parallel. The adjacent top edges 111, 211 are closer to each than the bottom edges 311, 411, whereby the wedge shaped light pipe is narrower at the top than at the bottom, and a planar entrance surface 51c is formed between the lower adjacent edges 351, 451 of the first and second planar surfaces 51a, 51b. By way of illustrative example, the first and second planar surfaces 11a, 11b are rectangular, and the edges 111, 211, 311, 411 are parallel. For such implementation, the cross section of the wedge shaped light pipe taken orthogonally to the edges 111, 211, 311, 411 is of constant shape along such edges. The adjacent top edges 111, 112 can of course be collinear, in which case the cross section of the wedge shaped light pipe taken orthogonally to the edges 111, 211, 311, 411 would be triangular.

An array 20 of highly collimated, suitably colored light emitting diodes (LEDs) 21 located adjacent the entrance surface provides nearly collimated light to the entrance surface 11c of the wedge shaped light pipe 11. The LEDs 21 are aligned relative to the entrance surface 11c in such manner that the light that is transmitted by the entrance surface 11c and travels within the light pipe 11 comprises light that is collimated at a non-zero angle with respect to the first planar surface 11a such that the transmitted light illuminates a rear lamp hologram 23 that is laminarly attached to the first planar surface 11a, but does not reflect at the second planar surface 11b.

For example, the transmitted light is collimated in a plane that is orthogonal to the first planar surface 11a and parallel to the optical axis of the transmitted light, and radiates parallel to a plane that passes through the light pipe 11 and is tilted toward the first planar surface 11a about an axis that is parallel to the first planar surface 11a and contained in a plane that is orthogonal to the optical axis of the transmitted light, such that the plane that is parallel to the radiation and the first planar surface 11a form an acute dihedral angle that faces the entrance surface 11c. For such example, the second planar surface 11b would be parallel to or tilted from the plane that is parallel to the radiation of the transmitted light. Thus, for the particular example wherein the first and second planar surfaces are rectangular, the edges 111, 211, 311, 411 are parallel, and the second planar surface 11b and the entrance surface 11c form a right angle, the optical axes of the LEDs 21 can be orthogonal to the entrance surface 11c. For such implementation, the rays of the transmitted light travelling in the light pipe 11 would be substantially parallel to the second planar surface 11b when viewed in a cross section that is orthogonal to the edges 111, 211, 311, 411, as schematically shown in FIG. 1.

The rear lamp hologram 23 is particularly configured to most efficiently diffract at a predetermined angle a predetermined range of wavelengths of the illumination provided by the array of LEDs. For the particular implementation of a rear stop lamp, the LEDs are red and the rear lamp hologram 23 is tuned for red light. For a rear turn signal lamp, the LEDs are amber and the rear lamp hologram 23 is tuned for amber light.

Referring now to FIG. 3, set forth therein is a schematic side elevational another holographic rear exterior vehicle lamp in accordance with the invention. The holographic rear exterior lamp includes a thin transparent light pipe 51 having a first planar surface 51a and a second planar surface 51b that is opposite the first planar surface 51a and can be parallel to the first planar surface 51a. The first planar surface 51a and the second planar surface 51b include adjacent top edges 151, 251 and adjacent bottom edges 351, 451, all of which can be parallel. An entrance surface 51c is formed between the lower adjacent edges 351, 451 of the first and second planar surfaces 51a, 51b. For the particular example wherein the first and second planar surfaces 51a, 51b are rectangular and of the same dimensions, and the edges 151, 251, 351, 451 are parallel, the cross section of the wedge shaped light pipe taken orthogonally to the parallel is a trapezoid of constant shape along such edges.

An array 60 of highly collimated, suitably colored light emitting diodes (LEDs) 61 located adjacent the entrance surface 51c provides nearly collimated light to the entrance surface 51c of the light pipe 51. The LEDs 61 are aligned relative to the entrance surface 51c in such manner that the light that is transmitted by the entrance surface 61c and travels within the light pipe 51 comprises light that is collimated at a non-zero angle with respect to the first planar surface 51a such that the transmitted light illuminates a rear lamp hologram 63 that is laminarly attached to the first planar surface 51a, but does not reflect at the second planar surface 51b.

For example, the transmitted light is collimated in a plane that is orthogonal to the first planar surface 51a and parallel to the optical axis of the transmitted light, and radiates parallel to a plane that passes through the light pipe 51 and is tilted toward the first planar surface 51a about an axis that is parallel to the first planar surface 51a and contained in a plane that is orthogonal to the optical axis of the transmitted light, such that the plane that is parallel to the radiation and the first planar surface 51a form an acute dihedral angle that faces the entrance surface 51c. For such example, the second planar surface 51b can be tilted away from the plane that is parallel to the radiation of the transmitted light, and thus can be parallel to the first planar surface 51a.

The rear lamp hologram 63 is particularly configured to most efficiently diffract at a predetermined angle a predetermined range of wavelengths of the illumination provided by the array of LEDs. For the particular implementation of a rear stop lamp, the LEDs are red and the rear lamp hologram 63 is tuned for red light. For a rear turn signal lamp, the LEDs are amber and the rear lamp hologram 63 is tuned for amber light.

While an array of LEDs 20, 60 is disclosed by way of illustrative example as a light source for producing reconstruction illumination for the rear lamp hologram 23, 63, it should be appreciated that other sources that provide partially collimated light that radiates parallel to at least one plane can be utilized, wherein the light is directed at the entrance surface 11c, 51c such that light refracted at the entrance surface radiates substantially parallel to a plane that is tilted toward the first planar surface 11a, 51a about an axis that is parallel to the first planar surface 11a, 51a and contained in a plane that is orthogonal to the optical axis of the transmitted light. For example, a neon linear lamp and an acylindrical reflector could be utilized. A linear array of incandescent bulbs and a colored cylindrical lens could also be utilized.

The foregoing has thus been a disclosure of a holographic rear exterior lamp that includes a hologram attached to one of two opposing surfaces of a thin light pipe that generally includes six surfaces, wherein the two opposing surfaces are configured such that light injected into the light pipe illuminates the hologram and does not internally reflect at the other of the opposing surfaces. The holographic rear exterior lamp is thin, compact and of light weight, and advantageously does not require the mounting depth and complexity of a conventional rear exterior lamp.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic rear exterior lamp for a vehicle, comprising:

a light pipe having a first planar surface and a second planar surface that are opposite each other, and a planar entrance surface between adjacent edges of said first planar surface and said second planar surface;

a rear exterior lamp hologram attached to said first planar surface of said light pipe; and means for illuminating said entrance surface with incident illumination such that transmitted illumination illuminates said rear exterior lamp hologram without reflection at said second planar surface;

whereby said rear exterior lamp hologram diffracts a portion of said transmitted light travelling within said light pipe to provide rear exterior lamp illumination.

2. The holographic rear exterior lamp of claim 1 wherein said incident illumination is partially collimated.

3. The holographic rear exterior lamp of claim 1 wherein said transmitted illumination radiates substantially parallel to a plane that is tilted relative to said first planar surface.

4. The holographic rear exterior lamp of claim 1 wherein said illuminating means comprises an array of light emitting diodes.

5. The holographic rear exterior lamp of claim 1 wherein said light pipe is wedge shaped.

6. The holographic rear exterior lamp of claim 5 wherein said second planar surface and said entrance surface are at a right angle.

7. The holographic rear exterior lamp of claim 5 wherein said incident illumination is partially collimated.

8. The holographic rear exterior lamp of claim 5 wherein said transmitted illumination radiates substantially parallel to a plane that is tilted relative to said first planar surface.

9. The holographic rear exterior lamp of claim 5 wherein said illuminating means comprises an array of light emitting diodes.

* * * * *